US011436612B2

(12) United States Patent
Sheehan et al.

(10) Patent No.: US 11,436,612 B2
(45) Date of Patent: Sep. 6, 2022

(54) SYSTEMS AND METHODS FOR DYNAMIC DIGITAL IDENTITY PROCESSING

(71) Applicant: REMITLY, INC., Seattle, WA (US)

(72) Inventors: William Sheehan, Spokane, WA (US); Nicholas Hodapp, Seattle, WA (US); Kyle Ellman, Seattle, WA (US)

(73) Assignee: REMITLY, INC., Seattle, WA (US)

( * ) Notice: Subject to any disclaimer, the term of this patent is extended or adjusted under 35 U.S.C. 154(b) by 19 days.

(21) Appl. No.: 16/864,761

(22) Filed: May 1, 2020

(65) Prior Publication Data

US 2021/0342858 A1 Nov. 4, 2021

(51) Int. Cl.
| | | |
|---|---|---|
| *G06Q 30/00* | (2012.01) | |
| *G06F 16/22* | (2019.01) | |
| *G06Q 20/10* | (2012.01) | |
| *G06Q 10/10* | (2012.01) | |

(52) U.S. Cl.
CPC ....... *G06Q 30/016* (2013.01); *G06F 16/2246* (2019.01); *G06Q 10/10* (2013.01); *G06Q 20/108* (2013.01)

(58) Field of Classification Search
CPC .... G06Q 30/016; G06Q 10/10; G06Q 20/108; G06F 16/2246
USPC .......................................................... 705/42
See application file for complete search history.

(56) References Cited

U.S. PATENT DOCUMENTS

| | | | | |
|---|---|---|---|---|
| 2014/0188677 | A1* | 7/2014 | Patel ...................... | G06Q 40/04 |
| | | | | 705/35 |
| 2016/0379116 | A1* | 12/2016 | Lottini ................ | G06F 16/2282 |
| | | | | 706/46 |
| 2021/0073706 | A1* | 3/2021 | Barry ............... | G06Q 10/06395 |
| 2021/0126794 | A1* | 4/2021 | Forrester ................. | G06F 16/27 |

OTHER PUBLICATIONS

Model-Driven Regulatory Compliance: A Case Sudy of 'Know Your Customer' Regulations. Sagar Sunkle; Deepali Kholkar; and Vinay Kulkarni. 2015 IEEE. (Year: 2015).*

* cited by examiner

*Primary Examiner* — Sara C Hamilton
(74) *Attorney, Agent, or Firm* — Buckley, Maschoff & Talwalkar LLC

(57) ABSTRACT

System and methods are provided for dynamic digital identity processing. In some embodiments, a policy request identifying a customer and a policy to be analyzed is received. A policy requirement tree associated with the policy to be analyzed is retrieved, the tree defining a set of requirements to be satisfied. Available evidence associated with the set of requirements is collected from the customer and a determination is made which requirements are satisfied by the available evidence and a subset of requirements remaining to be satisfied is generated.

12 Claims, 11 Drawing Sheets

410 ⟶

```
val policy = orNode ( name = "US KYC" ) {
  andNode ( name = "Everify" ) {
    requirement ( RiskEntityAttributeRequirement("name"))
    requirement ( RiskEntityAttributeRequirement("address"))
    orNode ( name = "Identity" ) {
      requirement ( RiskEntityAttributeRequirement("dob") )
      requirement ( RiskEntityAttributeRequirement("ssn"))
    }
  }
  requirement ( OutOfWalletRequirement() )
  andNode ( name = "Documents only" ) {
    orNode(name = "Proof Of Identity Document") {
      requirement ( DocumentProofOfIdentity("passport") )
      requirement ( DocumentProofOfIdentity("drivers_license") )
      // More document types here
    }
    orNode(name = "Proof Of Address Document") {
      requirement ( DocumentProofOfAddress("drivers_license") )
      requirement(DocumentProofOfAddress("utility_bill"))
      // More document types here
    }
}
```

```
val policy = andNode ( name = "UK 2 + 2" , constraints = setOf(non_intersect) ) {
  orNode ( name = "Proof of Identity" ) {
    requirement ( KycVendorSourceMatch("name_dob") )
    requirement(DocumentProofOfIdentity("passport"))
    requirement(DocumentProofOfIdentity("drivers_license"))
    // More document types here
  }
  orNode ( name = "Proof of Address" ) {
    requirement(KycVendorSourceMatch("name_address"))
    requirement(DocumentProofOfAddress("drivers_license"))
    requirement(DocumentProofOfAddress("utility_bill"))
    // More document types here
  }
}
```

FIG. 4B

SYSTEMS AND METHODS FOR DYNAMIC DIGITAL IDENTITY PROCESSING

BACKGROUND

It is becoming increasingly common for customers to initiate financial services transactions using mobile or other computing devices (for simplicity, referred to herein as a "customer device"). For example, customers frequently initiate cross border remittances using customer devices. These types of transactions require compliance with a number of regulations, including "know your customer" (KYC) regulations that ensure that the identity of the party initiating a transaction is confirmed. These regulations vary by jurisdiction and are relatively complex depending on a number of variables such as the transaction amount, the type of information that can be verified, and the sender and recipient jurisdictions. Further, when third party data sources are used to verify information, the nature of the data source is also a factor.

Customers initiating financial services transactions using customer devices interact with a user interface displayed on the device. The user interface generally takes the customer through a sequence of screens to collect the user's email, sender's personal information, recipient information, source of funds, remittance amount, and to perform KYC processing. Some of the screens may be different for different transactions. For example, a large remittance may require KYC information such an image of a driver's license or the like. As another example, in some countries, additional information may be required because the KYC databases have poor match rates and additional documentation is typically required. Unfortunately, these disruptions in the flow can be annoying to customers and can cause customers to drop or cancel transactions.

It would be desirable to provide systems and methods for dynamic resolution processing which changes a user interface and/or a process flow based on the nature of a transaction and the results of processing.

SUMMARY OF THE INVENTION

According to some embodiments, systems, methods, apparatus, computer program code and means are provided for dynamic resolution processing. In some embodiments, a policy request identifying a customer and a policy to be analyzed is received. A policy requirement tree associated with the policy to be analyzed is retrieved, the tree defining a set of requirements to be satisfied. Available evidence associated with the set of requirements is collected and a determination is made which requirements are satisfied by the available evidence and a subset of requirements remaining to be satisfied is generated.

In some embodiments, information about the subset of requirements is provided to an orchestrator component of a device associated with the customer to generate a set of user interface instructions. In some embodiments, the set of user interface instructions is generated to provide a most efficient customer experience. In some embodiments, the policy request is received in response to an action taken by the customer such as, for example, a request to initiate a first time remittance or a request to initiate a large remittance.

In some embodiments, the available evidence is analyzed to identify inconsistent evidence. In some embodiments, inconsistent evidence may result in termination of the request or referral of the request for manual processing.

In some embodiments, the policy to be analyzed is a policy having a constraint requiring multiple unique evidentiary sources be used, wherein the collecting available evidence associated with the set of requirements further comprises identifying multiple evidentiary sources providing the evidence where each of the multiple evidentiary sources have at least one of a (i) different category, and (ii) a different source name.

Some technical effects of some embodiments of the invention are improved and computerized ways to dynamically control and adapt resolution processing for transactions. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIGS. 4A and 4B illustrate DSL code examples in accordance with some embodiments.

DETAILED DESCRIPTION

The present invention provides significant technical improvements to transactions involving user interaction and data collection, making them highly dynamic. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of dynamic data collection and validation by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, managed, and/or used to navigate complex regulatory requirements imposed on transactions and data collection, such as by deploying and/or using computing components, and dynamic paths may be constructed during the transaction, thus improving the overall efficiency of an interaction (e.g., by reducing errors, reducing the use of unnecessary interactions, and improving match rates thereby reducing the need for manual intervention or review).

Figure 1:
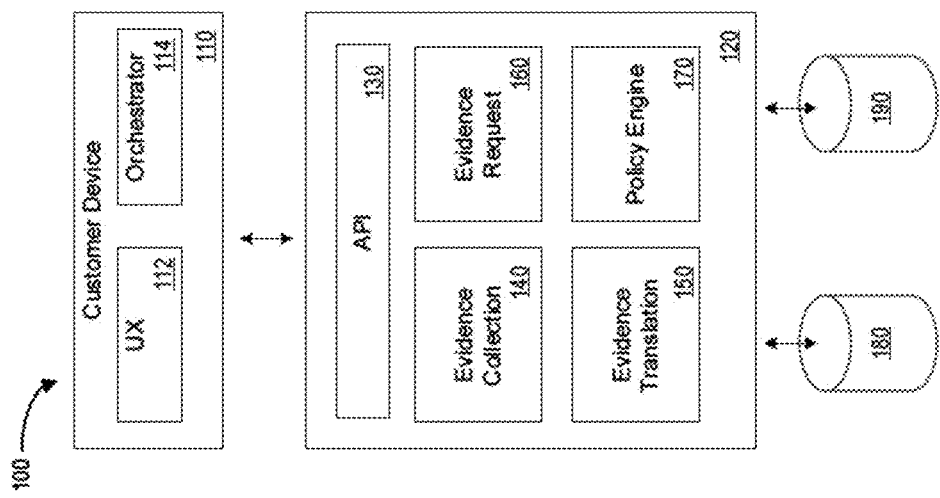
FIG. 1 is a high-level block diagram of a system according to some embodiments.

It would be desirable to provide systems and methods for dynamic resolution processing which changes a user interface and/or a process flow based on the nature of a transaction and the results of processing. FIG. 1 is a high-level block diagram of a system 100 according to some embodiments of the present invention. In particular, the system 100 includes a customer device 110 interacting with a policy system 120. The policy system 120 includes a number of applications or components, including, for example, an application programming interface ("API") 130, an evidence collection module 140, an evidence translation module 150, an evidence request service 160 and a policy engine 170. The policy system 120 interacts with one or more third party data sources 190 and stores and maintains translated evidence and policy data in one or more storage devices 180.

The customer device 110 interacts with the system 120 to perform processing involving one or more policies that are resolved or handled by the system 120. For example, the following is an illustrative but not limiting example which will be used to describe features of some embodiments throughout this disclosure. In the example, the customer operating the customer device 110 is a person who wishes to remit funds to a recipient in a different country. The person resides or currently is located in either the United States (US) or the United Kingdom (UK) (which locations may be varied during the present disclosure to illustrate different features of the present invention) and wishes to remit funds to a recipient in India. The remittance service provider has implemented resolution processing using features of the present invention, and the resolution processing is invoked when one or more policy(s) require resolution. For example, a policy that requires KYC processing may be invoked for every new customer who initiates a remittance transaction using the remittance service provider. More particularly, a US KYC policy may be invoked for a new customer in the US who initiates a remittance transaction, while a UK KYC policy may be invoked for a new customer in the UK who initiates a remittance transaction. As another example, a policy that requires a heightened level of fraud detection processing may be invoked if a customer wishes to request an increase in the amount of funds the customer is authorized to remit in a single transaction.

In the illustrative examples, the US or UK customer wishes to remit funds to a recipient in India. In each example, the customer is a first-time user of the remittance service and, as a result, is required to complete KYC processing according to the laws of the country they are resident in (e.g., either the US or the UK in the instant example). The user interacts with an application provided by the remittance service provider via the customer device 110 (e.g., either via a web browser or via an application installed on the customer device 110 and generally identified in FIG. 1 as the UX 112) and initiates a request to initiate a remittance. The application identifies that the request requires KYC processing and the customer device 110 is caused to interact with the policy system 120. The application may also provide information indicating the user's location to allow the policy system 120 to identify which KYC policy to apply (e.g., either the US or the UK policy in the instant example). This information may be provided by the user (by interaction with the application) or it may be discerned based on device data associated with the device 110. Information received from the policy system 120 may be processed by an orchestrator application 114 that operates to modify the UX 112 presented to the customer as will be described further herein. For example, the evidence request service 160 may determine that a piece of evidence (such as a photo of the customer's passport) is needed. The evidence request service 160 in conjunction with the orchestrator 114 cause a user interface (or sequence of user interfaces) to be presented to the customer which provides the most efficient or optimal customer experience (e.g., where the most efficient or optimal experience may be one with the fewest number of screens or steps required to provide the evidence or one with the least amount of additional evidence or documents required). In some embodiments, additional orchestration may occur at policy system 120. For example, in some situations, evidence may be provided by a customer (related to a policy requirement) via a different channel (e.g., such as by an email directed to the system 120). In such situations, the policy engine 170 (or other component of the system 120) may be operated to adjust the information provided to the orchestrator application 114 (e.g., to remove screens or interfaces associated with the provided evidence). In general, the orchestrator application 114 is configured to receive high level requirements (identified by the system 120) and, based on those requirements, identifies a user interface sequence without need to reference or request further information from the system 120. This provides a faster, more seamless customer experience. The system 120 performs a more thorough validation when the full set of evidence is gathered at the customer device 110 to ensure that the collected information satisfies the policy requirements (e.g., by completing authenticity checks that are not able to be completed by the customer device 110).

FIG. 1 only shows components that are relevant to the resolution processing of the present invention. In practical application, the system 100, when operated by a remittance service provider such as the assignee of the present application, would include a number of other components and systems to provide remittance processing services. The components shown in FIG. 1 are those that may be in use when a customer's remittance processing transaction requires some resolution processing. Those skilled in the art upon reading this disclosure will appreciate that the components of FIG. 1 may be integrated with components used for remittance processing. For example, the API 130 may be an API layer that supports a number of remittance processing services (not just the policy or resolution services described herein). As such, the API 130 may not be a part of the policy system 120.

A transaction or interaction that requires resolution processing may be redirected or otherwise referred to interact with the policy system 120. A user interface displayed on a display of the customer device 110 is controlled (as will be described further herein) to react to requirements identified by the policy system 120. Pursuant to embodiments of the present invention, the user interface is constructed as a generic front-end that is structured to dynamically react to different policy requirements provided by the policy system 120. Examples of the front-end will be described further below in conjunction with FIGS. 5-9. In general, the policy system 120 operates to apply one or more policies to a transaction. As used herein, a "policy" is a well-defined set of requirements that may be represented by a tree structure whose leaf nodes are specific requirements.

Figure 2:
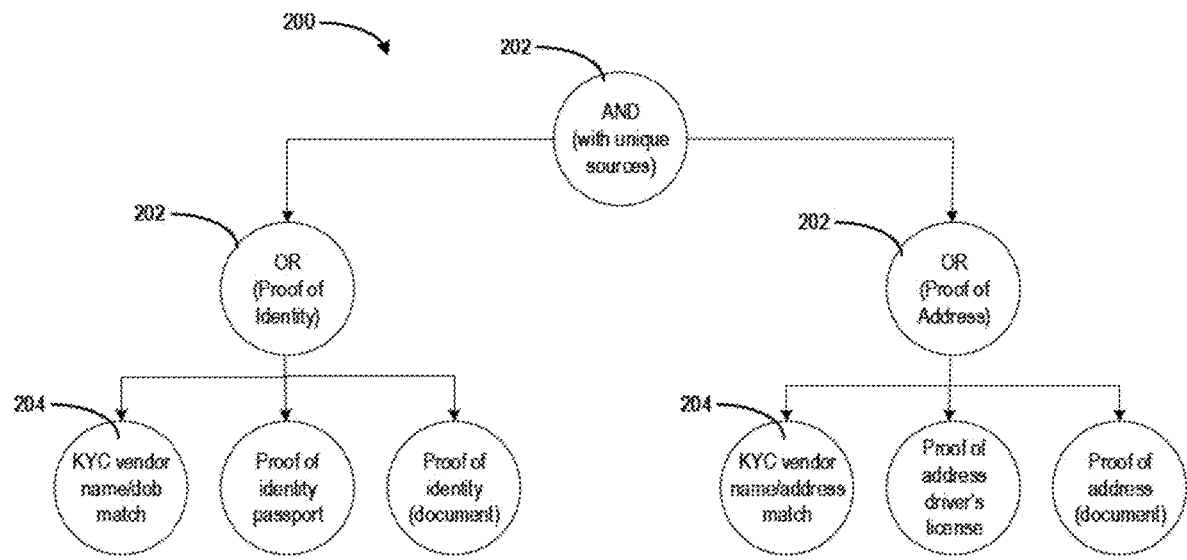
FIG. 2 illustrates a policy according to some embodiments.

In some embodiments, a policy may be described using a domain specific language ("DSL") implemented using a language such as, for example, Kotlin. An illustration of a specific policy is shown in FIG. 2. As shown, the policy 200 is represented as a tree having a number of nodes 202. A node can require that 1 to n of its children 204 be satisfied and also that special constraints be enforced. For example, a special constraint may be a "non_intersect" constraint that requires that none of the child nodes or requirements share any evidentiary sources. The policy shown in FIG. 2 is an example of a policy implementing KYC rules for customers in the US. That is, the policy 200 may be invoked when a new US customer wishes to conduct a remittance transaction with a remittance service provider using the system of the present invention. As shown, the policy 200 requires that both a proof of identity and a proof of address be obtained. The proof of identity requirement may be satisfied by any of: (i) a match from a KYC vendor database lookup in which there is a name and date of birth ("DOB") match, (ii) proof of identity from a passport, or (iii) proof of identity (from some other document). The proof of address requirement may be satisfied by any of: (i) a match from a KYC vendor database lookup in which there is a name and address match, (ii) proof of address from a driver's license, or (iii) proof of address (from some other document).

Pursuant to some embodiments, the DSL for a policy is structured as follows. First, the policy requirements are the leaf nodes in the tree and represent a piece of data that can be distilled into a Boolean representation such as, for example, "document that proves identity" or "supplied full SSN", or "vendor verified address", or the like. As different data sources may be responsive for different pieces of data, a class structure may be provided to fetch the status of a requirement and to obtain the data (and provide a true/false indication of whether the fetched data satisfies the policy requirement). Next, the policy nodes are the nodes in the tree and can contain policy requirements or other nodes. Child nodes and requirements are, in some embodiments, treated as unordered lists and have no priority over one another. Child nodes have three attributes: (i) a name (for forced documentation, readability and debugging), (ii) a required indicator (an integer that states how many of a node's children need to be satisfied for it to also be satisfied—this makes for a more flexible DSL than only using logical ORs and ANDs, but orNode and andNode options are still available), and (iii) one or more optional constraints (a set of enumerated constraints such as, for example, "non_intersect" a constraint that enforces that each source of evidence in a node can only be used to satisfy one requirement).

Examples of DSL code are shown in FIG. 4. In FIG. 4A, an example of a DSL defining a policy for a US KYC policy 410 is shown. In FIG. 4B, an example of a DSL defining a policy for a UK KYC policy 420 is shown. In the policy 420, the "non_intersect" constraint is provided in the policy indicating that each of the sources of evidence must be unique. Those skilled in the art, upon reading this disclosure, will appreciate that a wide variety of different policies may be described using this approach.

Referring again to FIG. 1, further details of the policy engine 120 will now be provided. The policy engine 120 is an application or component that receives information associated with a policy as well as evidence provided by an evidence collection 140 component (obtained from, for example, third party data sources 190) and applies the evidence to the requirements in all possible combinations. The policy engine 120 identifies a collection of possible solutions as well as information identifying whether each possible solution satisfies the policy or if not, what additional evidence is required to satisfy the policy. The policy engine 120 achieves this by recursively traversing a policy tree (such as the tree illustrated in FIG. 2) and applying evidence (collected by evidence collection module 140 and normalized or translated by evidence translation module 150) to the requirements (the leaf nodes 204) and iteratively working back up the tree, checking for source uniqueness constraints (such as the "non_intersect" constraint described above) and reworking solutions when necessary to remove invalid solutions.

Pursuant to some embodiments, the policy engine 170 is not responsible for determining which solution would be easiest for a customer to complete. Instead, the policy engine 170 generates a complete set of possible solutions for the evidence request service 160 to choose from that provides the best possible customer interaction. Put another way, in some embodiments, the policy engine 170 provides the options, but does not order or select them. In some embodiments if the policy engine 170 determines that a policy is satisfied, an alert or other information may be generated informing the remittance processing system of the status.

Evidence (such as data from third party data sources 190 or information provided by the customer via the customer device 110) is collected under control of the evidence collection 140 component based on requirements identified in a policy. For example, policy requirements can be satisfied by a piece of evidence which could be a customer document, a combination of KYC vendor responses, an out of wallet ("OOW") set of data, a customer's answer to a question, or the like. Each type of requirement is a class in the policy code and defines the type of evidence it accepts and determines if a gathered piece of evidence ("raw" evidence) satisfies the requirement. Raw evidence may be part of an API response from another service or any object that isn't directly related to the policy. The policy requirement will cause the raw evidence to be placed into a standardized "translated evidence" object that describes whether the evidence satisfies the requirement, whether it is suspicious, its expiration date (if any), if it is a "generic" source (to be used when enforcing a uniqueness constraint), and a reference to the original raw evidence (for audit purposes). The translation of the raw evidence to translated evidence may be performed by, for example, evidence translation module 150.

In some embodiments, the operation of policy system 120 may result in one or more alerts which may be transmitted or otherwise provided to other components of a remittance processing system (not shown). For example, there are situations where a single piece of evidence (or a combination of pieces of evidence) are suspicious and should be subject to human review. These situations could be triggered by the evidence translation component 150 (as that component is already checking single pieces of raw evidence to determine if they satisfy a policy requirement, the component may also be configured to determine if the evidence is suspicious or not). As an example, a forged document may be identified as suspicious and an alert may be created. The evidence collection component 140 may also be configured to identify suspicious items of evidence. For example, when collecting bulk evidence for a policy (e.g., such as a set of customer documents), the evidence collection component 140 may be configured to identify mismatched data within the collection (e.g., such as a disparity in date of birth on different documents). In some embodiments, the event of identification of a suspicious item of evidence, an alert may be generated, and a response may be provided to the customer device 110 indicating that a review is required. In other embodiment, the identification of a suspicious item of evidence will trigger that item for further processing or human review.

As the policy requirements are identified, the user interface of the customer device 110 may be changed to present the customer with information and/or to prompt the customer to provide information responsive to the requirements. Embodiments described herein allow the resolution or application of such policies efficiently, reducing customer abandonment of transactions and also reducing the need for human review or resolution.

The policy system 120 and/or other devices described herein might be, for example, associated with a Personal Computer ("PC"), laptop computer, smartphone, an enterprise server, a server farm, and/or a database or similar storage devices. According to some embodiments, an "automated" policy system 120 may automate the identification and application of one or more policies based on information obtained from the customer device 110 or one or more data stores 180, 190. As used herein, the term "automate" may refer to, for example, actions that can be performed with little (or no) intervention by a human.

As used herein, devices, including those associated with the policy system 120 and/or any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Although a single customer device 110, and policy system 120 are shown in FIG. 1, any number of such devices may be included. Moreover, various devices described herein might be combined according to embodiments of the present invention. For example, in some embodiments, the policy and evidence data store 180 and/or the policy system 120 might be co-located and/or may comprise a single apparatus.

Figure 3:
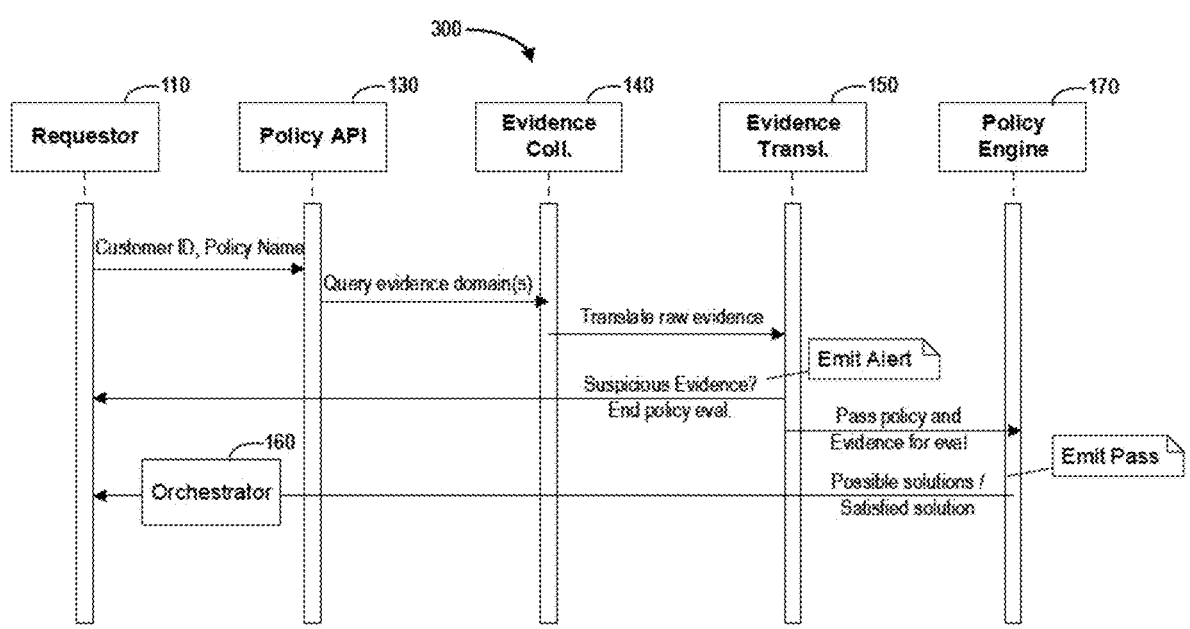
FIG. 3 is a high-level process flow in accordance with some embodiments.

The system 100 of FIG. 1 is provided only as an example, and embodiments may be associated with additional elements or components. According to some embodiments, the elements of the system 100 may automatically facilitate the application and execution of policies as well as the orchestration of user interfaces to collect further evidence. For example, FIG. 3 illustrates a process 300 that might be performed by some or all of the elements of the system 100 described with respect to FIG. 1, or any other system, according to some embodiments of the present invention. The flow charts and processes described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

As shown in FIG. 3, a number of components or modules of system 100 interact to execute a policy. The process may start when a requestor (such as a customer device 110) initiates or causes a request for a policy analysis to be performed. Alternatively, or in addition, the process may start when the requestor performs some other interaction which may trigger the execution of a policy. For example, an existing customer of system 100 may interact with the system 100 via a customer device 110 to initiate a large value remittance transfer. In some situations, such large value remittances may trigger execution of a KYC (or an enhanced KYC) policy. Those skilled in the art, upon reading the present disclosure, will appreciate that embodiments may initiate the execution of one or more policies in a number of different situations and the specific example described herein is for illustrative purposes.

The request is transmitted to the policy API 130 with information identifying the policy (e.g., by name or an identifier) as well as information identifying the customer. The policy API 130 causes a request to be provided to the evidence collector 140 to query each evidence domain for raw evidence (e.g., risk vendor data, customer documents previously provided, etc.). This data may be obtained from third party data sources 190 and policy/evidence data stores 180. Processing continues as the evidence collector 140 passes the raw evidence to the evidence translator 150 which translates the raw evidence into a normalized set of policy requirement evidence (e.g., in a standardized JSON object or the like). In some embodiments, the evidence translator 150 may be responsible for detecting whether any of the provided evidence is suspicious or inconsistent in a way which would give rise to suspicions. If any is detected, processing continues by emitting an alert flagging the suspicious evidence and returning an error or other response to the requestor 110. In the event of such processing, the policy evaluation may be stopped or subject to further processing until the error or indicia of suspicion can be resolved. If no suspicious evidence is detected, processing continues by providing the translated evidence and the policy to the policy engine 170 for evaluation. The policy engine 170 recursively traverses the policy tree and applies the evidence to the requirements and works its way up the tree, checking for source uniqueness constraints (if any) and reworking solutions when necessary to remove invalid solutions. If the policy engine determines that the policy is satisfied, an event is emitted and a success response may be returned to the requestor 110. If the policy engine determines that possible solutions require additional evidence, the set of possible solutions is provided to the evidence request service 160. The evidence request service 160 (possibly in conjunction with orchestrator 114 on the customer device 110) causes a most desirable or efficient solution to be selected and causes a user interface 112 of the customer device 110 to be updated to follow the selected solution. For example, if the evidence request service 160 determines that a photo of the customer's drivers license is required, the orchestrator 114 may cause the user interface to be reconfigured to prompt the customer to take a photo of the customer's drivers license to satisfy the requirement.

In some embodiments, the evidence request service 160 may generate a JSON object for delivery to the orchestrator 114 of the customer device 110 for control of the flow and look of a user interface presented to the customer. For example, the JSON object may include information that identifies a type of user interface to be presented to the customer as well as instructions or messaging to be presented in that user interface. Further, the JSON object may define any steps or dependencies (to control the flow of screens once the customer provides information or interacts with the user interface). Embodiments perform this by using standardized templates for certain components of the user interface as will now be described.

Figure 5:
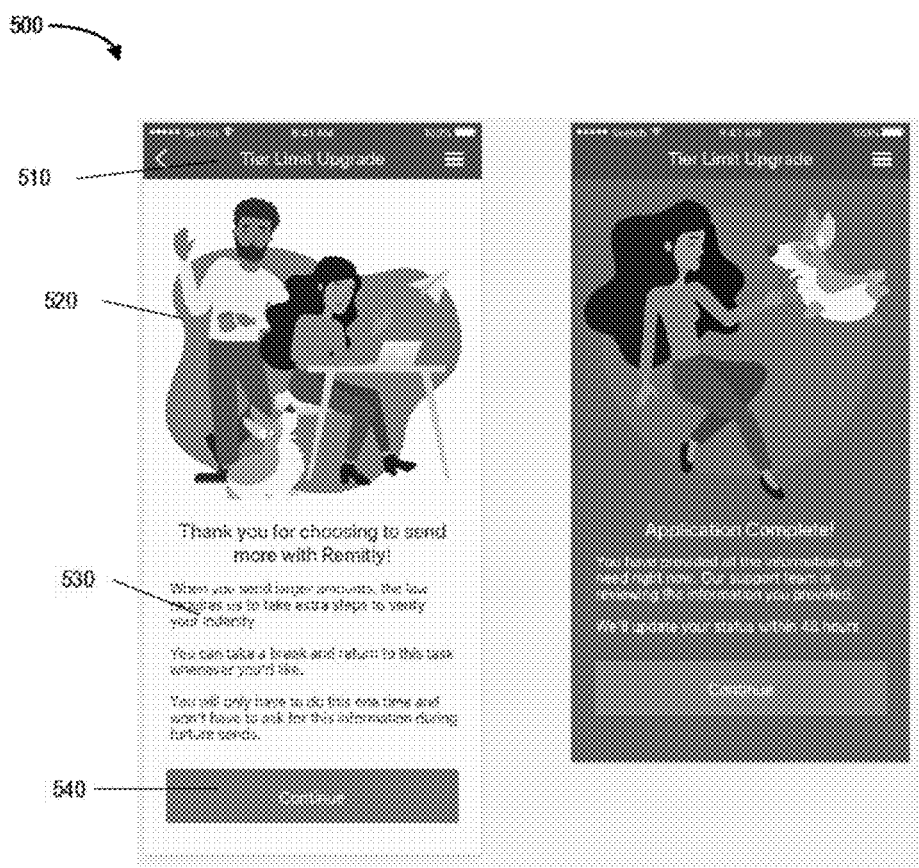
FIGS. 5-9 illustrate example user interfaces in accordance with some embodiments.
Figure 6:
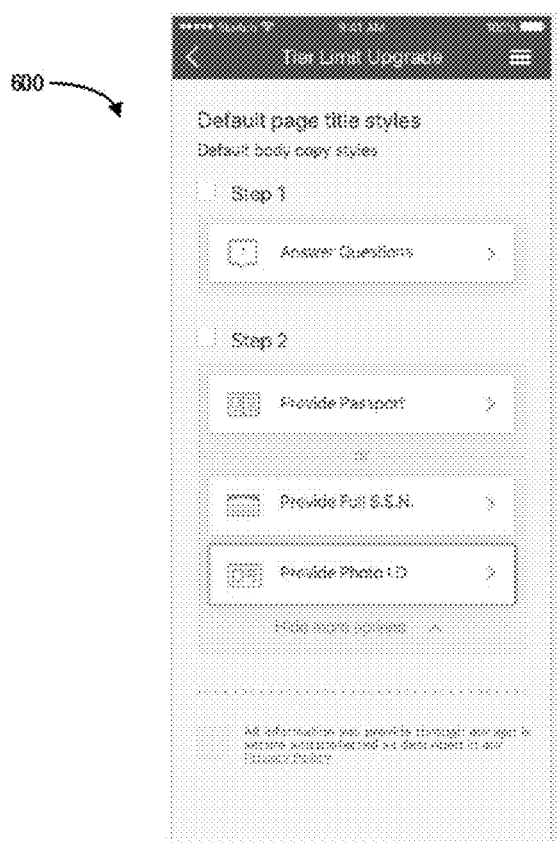
Figure 7:
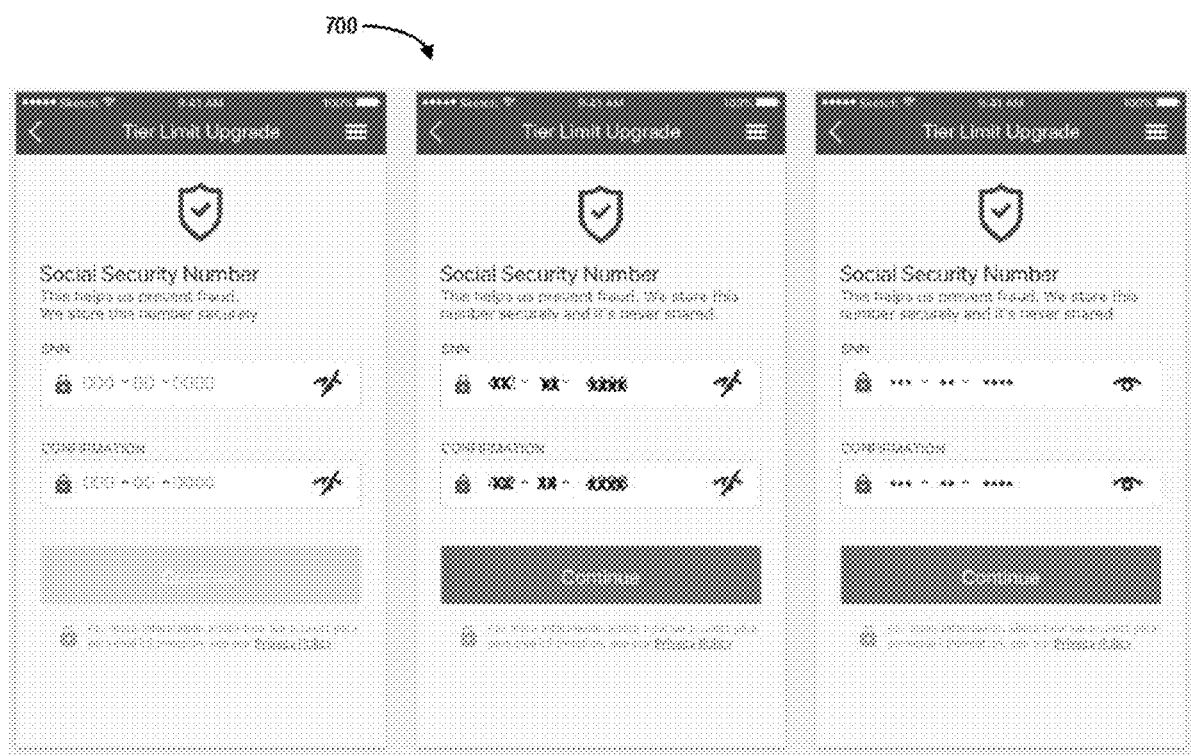
Figure 8:
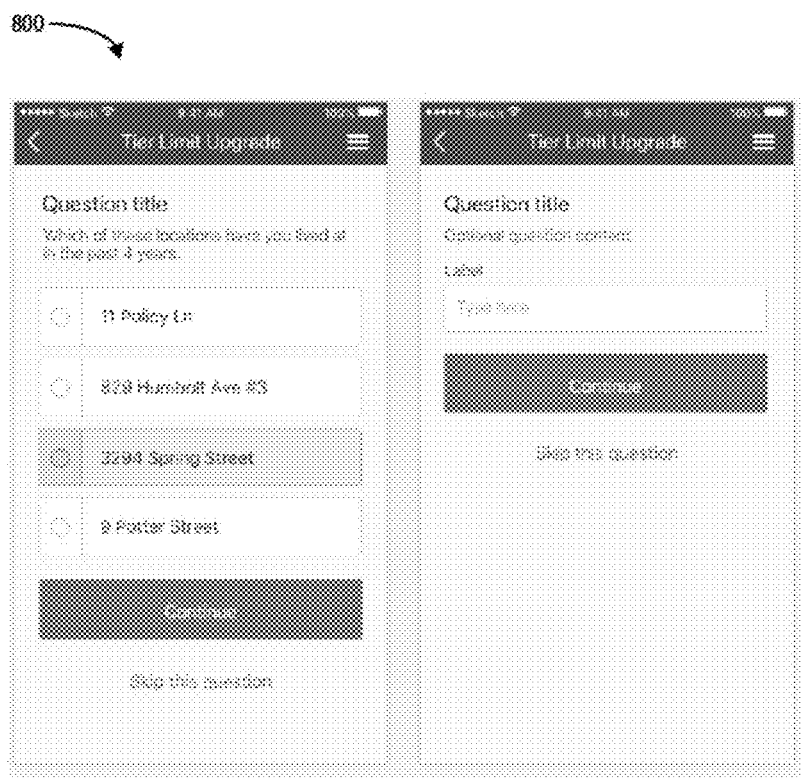
Figure 9:
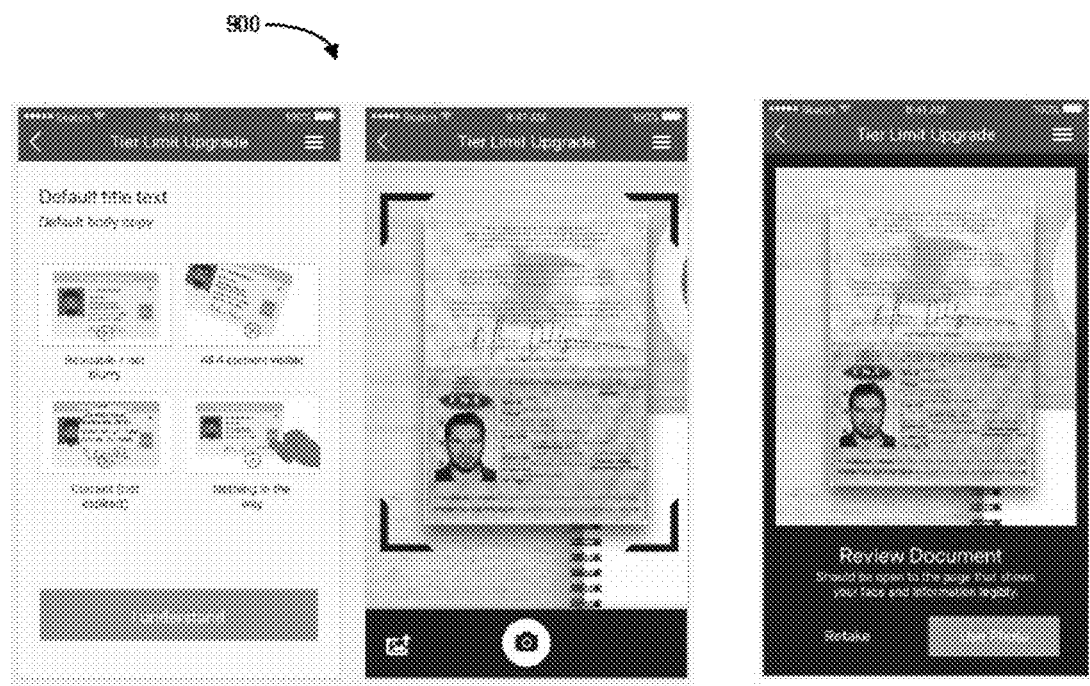

Referring first to FIG. 5, an illustration of a user interface 500 is shown. The user interface 500 includes a number of areas or regions, including a title area 510, a hero image area 520, a markdown text area 530 and a button area 540. Each of these components may be configured in the JSON object returned to the customer device 110 from the evidence request service 160 and may be used to present instructions to the user about evidence to be provided by the customer to satisfy a policy. Different types of user interfaces may be provided, each having areas or regions that may be configured by the orchestrator 114. For example, the following user interface types have been found to provide desirable results when used in conjunction with the policy system and orchestrator of the present invention: (i) a checklist type (having steps that are driven by lists provided by the orchestrator and with buttons that take the customer to an evidence collection flow) (a checklist type screen 600 is shown in FIG. 6), (ii) a message user interface (as shown in FIG. 5), (iii) a specific evidence collection flow (such as a US social security number collection screen 700 as shown in FIG. 7), (iv) a question type screen 800 which consists of a title, a subtitle, and one or more inputs (as shown in FIG. 8), and (v) a document type screen 900 which is a series of screens (as shown in FIG. 9). The document type screen 900 provides the user with a set of instructions and then a series of screens to perform the document capture and confirm the captured document is correct.

Pursuant to embodiments of the present invention, the JSON object produced by the evidence request service 160 based on the output of the policy engine 170 provides controls to determine how the user interfaces 500-900 should appear and what sequence any of the interfaces should be presented in. For example, the JSON object may include data elements that correspond to the title 510, hero image 520, markdown text area 530 and button 540 of a message screen (as shown in FIG. 5) to customize messaging to a customer. In this manner, embodiments can tailor a user experience that reduces the amount of time and effort required to submit evidence or comply with a policy.

Figure 10:
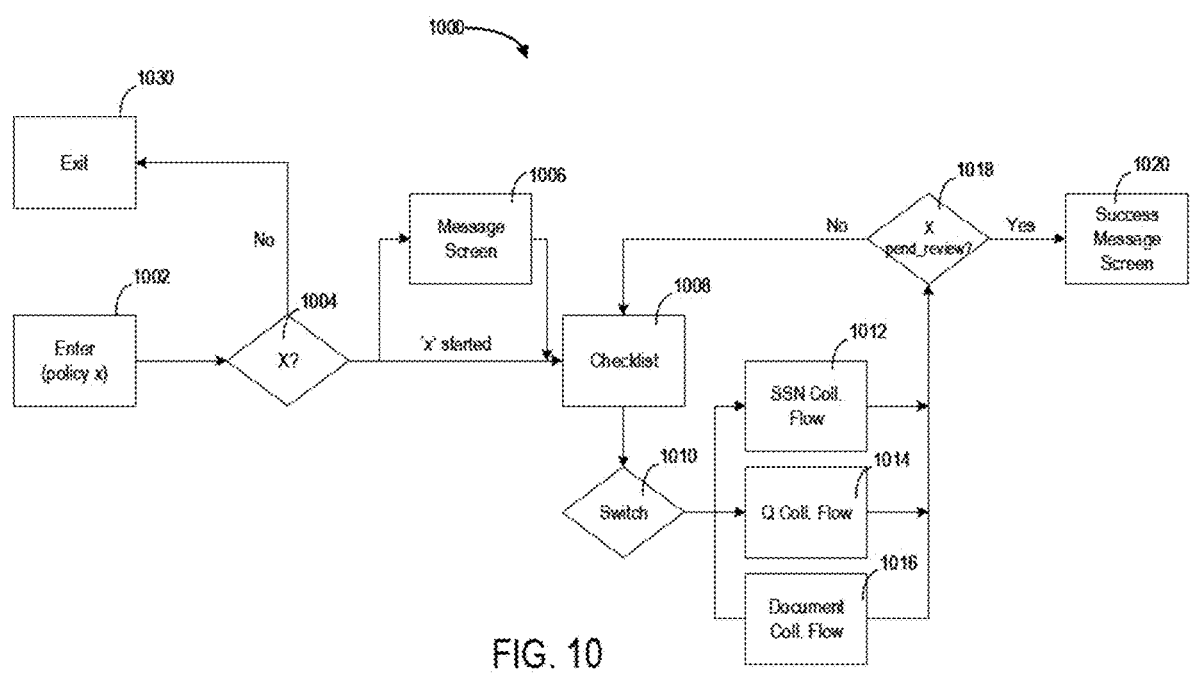
FIG. 10 illustrates a process flow in accordance with some embodiments.

Reference is now made to FIG. 10 where a process 1000 pursuant to some embodiments is shown. In particular, process 1000 depicts processing at a user interface of a customer device 110 in response to instructions provided by evidence request service 160 in the execution of a policy flow. As described above, the details of each screen presented on the customer device 110 change based on the instructions received from the evidence request service 160 (e.g., in conjunction with processing by orchestrator 114). Further, the sequence and existence of screens may also vary based on the instructions. The process 1000 starts at 1002 where the user enters the sequence of user interfaces with a specific request (e.g., such as a policy request which causes a call to the API 130 as discussed above). At 1004, a determination is made whether the process ("x") has started or is in a state of "not_started". If neither is true, processing continues at 1030 and the process terminates.

If the process "x" has "not_started", processing continues to 1006 where a message screen with instructions to the customer is presented to the customer (e.g., in the template shown in FIG. 5) and then goes to 1008 upon a button click from the customer. If the process "x" has "started" (e.g., the customer is interacting with the screens to provide additional evidence as directed by the evidence request service 160), the process continues at 1008 and a checklist screen is presented to the customer (e.g., in the format or style shown in FIG. 6). The customer selects an item from the checklist, and logic at 1010 switches the next screen depending on the type of list item the customer selected (e.g., to present either a SSN collection flow 1012, a question collection flow 1014 or a document collection flow 1016). The logic at 1010 may be dictated by the orchestrator 114. Upon submission of all the required evidence (e.g., completion of the checklist 1008), processing continues at 1020 where a success message is presented to the customer. In this manner, embodiments allow a series of screens to be dynamically constructed based on the evidence needed to satisfy a policy.

Embodiments may provide data users the ability to design and structure new data elements to be implemented and used in transactions and functions employing the guided navigational functions. If users are not assisted by the programmatic design or path, they can further refine the system by customizing the path in which they take through the system. These refinements are sent to the programmatic engine to determine if further refinements can be made to the algorithm employed.

As discussed above, one particular constraint that may be enumerated in a policy (and associated with one or more nodes of the policy) is a "non_intersect" constraint. This constraint has particular relevance in policies related to KYC processing. KYC analyses typically rely on a number of KYC vendor data sources (which are provided as third party data sources 190 in the system 100). These vendor data sources may be fee based. As a result, it is desirable to reduce the number of data sources that need to be consulted when analyzing compliance with a policy. Further, querying different vendor data sources can impose delay in processing from the user's perspective. If multiple data sources are consulted in sequence, the total time delay can be noticeable and undesirable to customers wishing to conduct a transaction. As a result, it is desirable to provide an approach which optimizes how different vendor data sources are consulted. Unfortunately, many third party data sources are not unique sources—they may share the same data. For example, two aggregated telephone databases may share data and do not count as unique data sources for address verification. In order to optimize processing of policy compliance, it is important to understand which sources count as "non_intersect" data sources for different types of data.

In jurisdictions which require that multiple unique data sources be consulted it is desirable to do such processing efficiently. Embodiments achieve this, in part, by classifying source data with a categorization schema as shown in TABLE I below.

TABLE I

| Element | Examples | Nullable? | Notes |
| --- | --- | --- | --- |
| Source Vendor | Vendor X, Vendor Y | No | Name of vendor |
| Source Category | Telephone database, credit agency, voting register | Yes | Type of source |
| Source Name | Mobile Provider X, , Credit Database Z | Yes | Specific identifier for the source |

This categorization schema allows systems of the present invention to count sources without risk of double counting an individual source. For example, if two data sources have unique names, the two sources are unique. If two data sources are unnamed, but the categories are different, then the sources are unique. In this manner, embodiments allow a set of sources to be identified before the source is queried to reduce the number of queries made (thereby reducing cost and time spent). In general, pursuant to the present invention, sources are compared on the least granular level available (as between category and source name) in order to avoid double-counting a single source.

Figure 11:
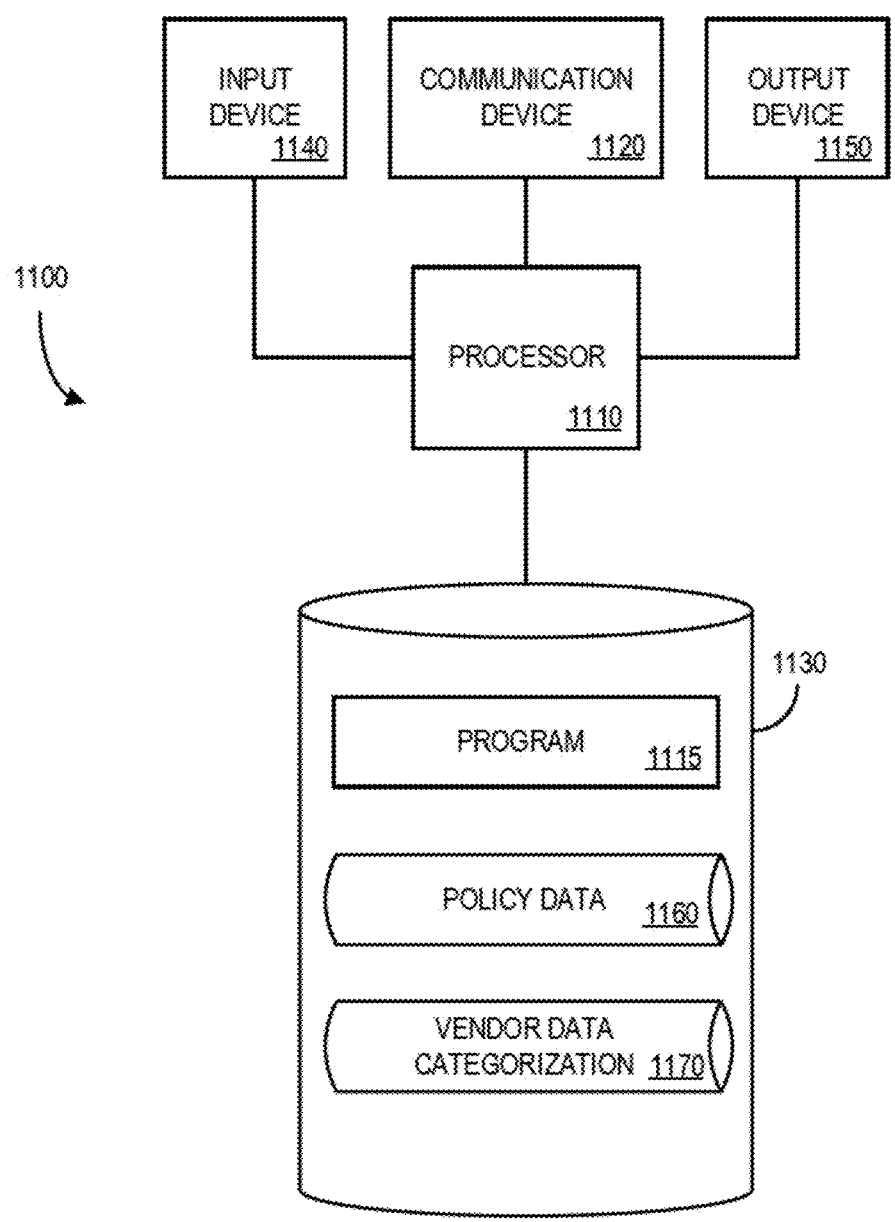
FIG. 11 is a block diagram of an apparatus in accordance with some embodiments of the present invention.

The embodiments described herein may be implemented using any number of different hardware configurations. For example, FIG. 11 illustrates a policy system 1100 that may be, for example, associated with the system 100 of FIG. 1. The policy system 1100 comprises a processor 1110, such as one or more commercially available Central Processing Units ("CPUs") in the form of microprocessors, coupled to a communication device 1120 configured to communicate via a communication network (not shown in FIG. 11). The communication device 1120 may be used to communicate, for example, with one or more remote user terminals, data stores, and/or or other communication devices (e.g., customer devices 110). Note that communications exchanged via the communication device 1120 may utilize security features, such as those between a public internet user and an internal network of the remittance processing service provider. The security features might be associated with, for example, web servers, firewalls, and/or PCI infrastructure. The policy system 1100 further includes an input device 1140 (e.g., a mouse and/or keyboard to enter information about policies, documents, inputs, outputs, etc.) and an output device 1150 (e.g., to output reports regarding system administration, results, current document or user statuses, etc.).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores one or more programs 1115 (e.g., such as program instructions for evidence collection 140, evidence translation 150, policy engine 170 or evidence requesting 160 as described above) for controlling the processor 1110. The processor 1110 performs instructions of the program 1115, and thereby operates in accordance with any of the embodiments described herein. For example, the processor 1110 may operate to perform evidence collection by accessing one or more vendor data sources.

The program 1115 may be stored in a compressed, uncompiled and/or encrypted format. The program 1115 may furthermore include other program elements, such as an operating system, a database management system, and/or device drivers used by the processor 1110 to interface with peripheral devices.

As used herein, information may be "received" by or "transmitted" to, for example: (i) the policy system 1100 from another device; or (ii) a software application or module within the policy system 1100 from another software application, module, or any other source.

In some embodiments (such as shown in FIG. 11), the storage device 1130 further stores a policy database 1160 (e.g., storing indications about different policies to be applied by the system, etc.) and a vendor data categorization database 1170 (e.g., storing a categorization schema to allow the efficient selection of vendor data sources as described herein).

Although specific hardware and data configurations have been described herein, note that any number of other configurations may be provided in accordance with embodiments of the present invention (e.g., some of the databases described herein may be combined or stored in external systems). Similarly, although a certain number of computing components were provided in connection with some embodiments described herein, other numbers of components (and different types of components) might be used instead. Still further, the displays and devices illustrated herein are only provided as examples, and embodiments may be associated with any other types of user interfaces.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computerized method, comprising:
receiving, by a processor of a policy system, a policy request identifying a customer and a policy to be analyzed, the policy defining a set of requirements to be satisfied;
retrieving, by the processor, a policy requirement tree associated with the policy to be analyzed, the policy requirement tree being a tree structure representation of the set of requirements to be satisfied whose leaf nodes are specific requirements of the policy;
collecting, by the processor from a data source, available evidence associated with the set of requirements of the policy;
determining, by traversing the policy requirement tree by the processor, which requirements of the set of requirements to be satisfied are satisfied by the available evidence;
identifying, by traversing the policy requirement tree by the processor, a subset of requirements of the policy to be satisfied; and
transmitting, by the processor, a set of instructions to a customer device associated with the customer, the set of instructions including information that identifies a type of user interface to be presented and causing the user interface of the customer device to display information in a series of interactive screens in response to the subset of the requirements of the policy to be satisfied.

2. The computerized method of claim 1 wherein the set of instructions is generated, by the processor, to cause the user interface of the customer device to display information to provide an efficient customer experience.

3. The computerized method of claim 1, wherein the policy request is received from the customer device in response to an action taken by the customer.

4. The computerized method of claim 3, wherein the action is one of (i) a request to initiate a first time remittance, and (ii) a request to initiate a large remittance.

5. The computerized method of claim 1, further comprising:
analyzing, by the processor, each of the available evidence to identify inconsistent evidence.

6. The computerized method of claim 1, further comprising:
receiving, by the processor, additional evidence associated with the subset of requirements to be satisfied; and
determining, by the processor, which of the subset of requirements are satisfied by the additional evidence.

7. The computerized method of claim 1, wherein the policy to be analyzed is a policy having a constraint requiring multiple unique evidentiary sources be used, wherein the collecting of available evidence associated with the set of requirements further comprises:
identifying, by the processor, multiple evidentiary sources providing the evidence where each of the multiple evidentiary sources have at least one of a (i) different category, and (ii) a different source name.

8. A system to conduct dynamic resolution processing, comprising:
(a) at least one data store containing electronic data records each representing a policy defining a set of requirements to be satisfied and a policy requirement tree associated with the policy, the policy requirement tree being a tree structure representation of the set of requirements to be satisfied whose leaf nodes are specific requirements of the policy;

(b) a communication port to facilitate an exchange of information with at least a first remote customer device supporting an interactive user interface display controlled, in part, by an orchestrator component of the first remote customer device; and (c) an application computer server, coupled to the data store and the communication port, programmed to:
receive, from the remote customer device, a policy request identifying a customer and a policy to be analyzed;
retrieve, from the at least one data store, a policy requirement tree associated with the policy to be analyzed identified in the policy request, the policy requirement tree being a tree structure representation of the set of requirements to be satisfied whose leaf nodes are specific requirements of the policy identified in the policy request;
collect, from a data source, available evidence associated with the set of requirements of the policy identified in the policy request;
determine, by traversing the policy requirement tree, which requirements of the set of requirements to be satisfied are satisfied by the available evidence;
identify, by traversing the policy requirement tree, a subset of requirements of the policy to be satisfied; and
transmit a set of instructions to the first remote customer device associated with the customer, the set of instructions including information that identifies a type of user interface to be presented and causing a user interface of the first remote customer device to display information in a series of interactive screens in response to the subset of the requirements of the policy to be satisfied.

9. The system of claim 8, wherein the policy request is received from the first remote customer device in response to an action taken by the customer, where the action is one of (i) a request to initiate a first time remittance and (ii) a request to initiate a large remittance.

10. The system of claim 8, wherein the application computer server is further programmed to:
analyze each of the available evidence to identify inconsistent evidence.

11. The system of claim 8, wherein the application computer server is further programmed to:
receive additional evidence associated with the subset of requirements to be satisfied; and
determine which of the subset of requirements are satisfied by the additional evidence.

12. The system of claim 8 further comprising at least a second data store containing electronic data records each representing an evidentiary source, one or more source categories, and a source name, wherein the policy to be analyzed is a policy having a constraint requiring multiple unique evidentiary sources be used, wherein the collecting of available evidence associated with the set of requirements further comprises:
identifying multiple evidentiary sources providing the evidence where each of the multiple evidentiary sources have at least one of a (i) different category, and (ii) a different source name.

* * * * *